United States Patent [19]
Polvani

[11] Patent Number: 5,425,001
[45] Date of Patent: Jun. 13, 1995

[54] NAVIGATION SYSTEM FOR AN UNDERWATER VEHICLE

[75] Inventor: Donald G. Polvani, Arnold, Md.

[73] Assignee: Westinghouse Electric Corporation, Pittsburgh, Pa.

[21] Appl. No.: 255,863

[22] Filed: Jun. 7, 1994

[51] Int. Cl.$^6$ .............................................. G01V 3/165
[52] U.S. Cl. ................................. 367/131; 114/21.3
[58] Field of Search ................. 367/131; 114/21.3; 102/402; 89/1.13; 364/424.02, 462; 324/345

[56] References Cited

PUBLICATIONS

IEEE Transactions on Magnetics, vol. MAG-II, No. 2, Mar. 1975, by W. M. Wynn et al., pp. 701-707, entitled "Advanced Superconducting Gradiometer/Magnetometer Arrays And A Novel Signal Processing Technique."

Aviation Week & Space Technology, McGraw Hill, Military Electronics, p. 101 Jun. 15, 1992, for "New Inertial Sensor Uses Quartz Crystal Technology."

*Primary Examiner*—Daniel T. Pihulic

[57] ABSTRACT

A method and apparatus for navigating underwater a killer vehicle towards a mine emitting a magnetic field by using measurements of the mine's magnetic field, by two magnetic sensors affixed to the killer vehicle, in calculating the relative position of the killer vehicle with respect to the mine.

5 Claims, 3 Drawing Sheets

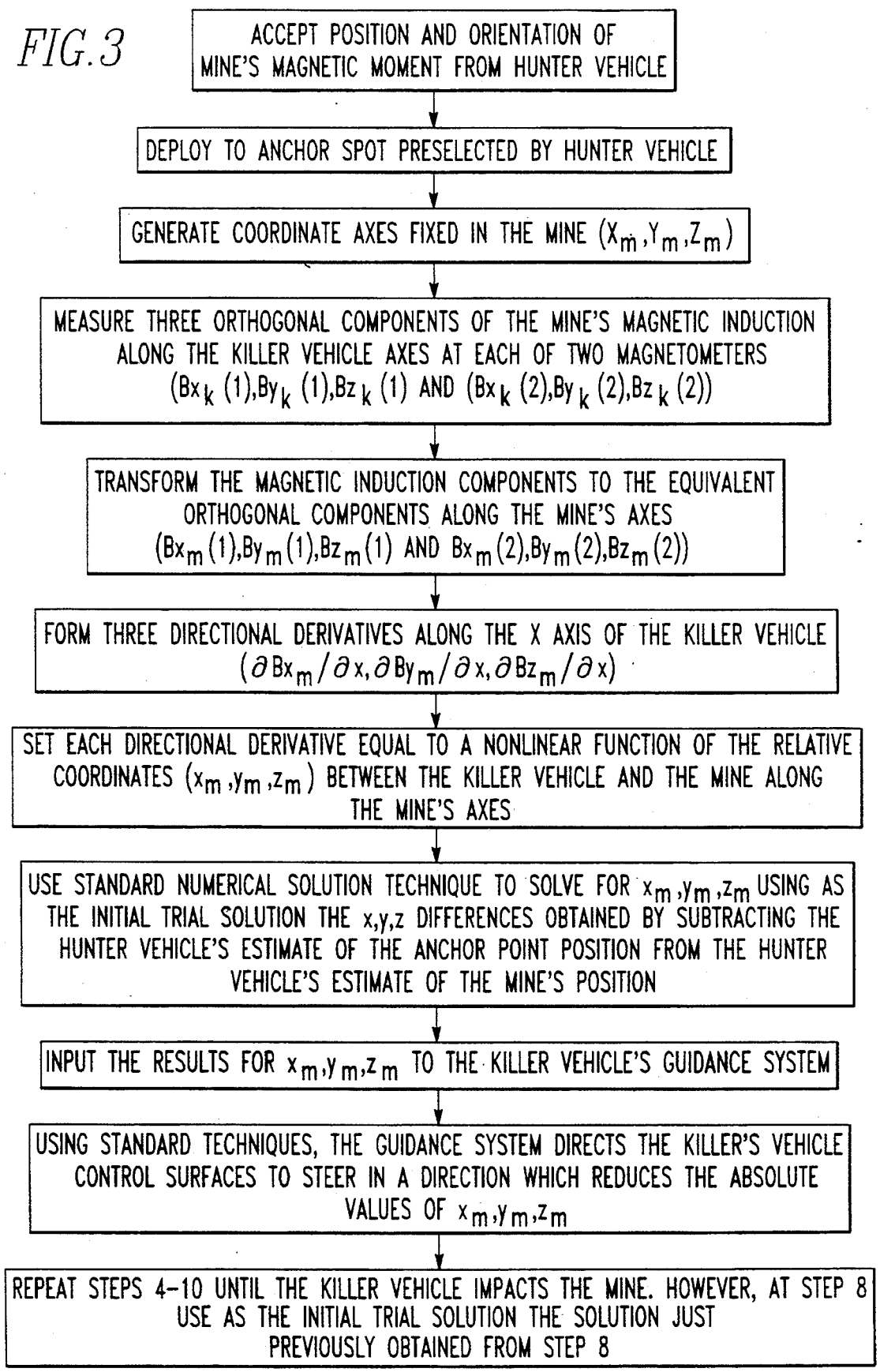

NAVIGATION SYSTEM FOR AN UNDERWATER VEHICLE

BACKGROUND OF THE INVENTION

The present invention relates to a navigation system. More particularly, the invention relates to a method of and system for navigating a killer vehicle near an underwater mine emitting a magnetic field. The invention uses measurements of the mine's magnetic field, supplied by two magnetic sensors affixed to the killer vehicle, to calculate the relative position of the killer vehicle from the mine.

In modern conflict, the ability to quickly find and destroy sea mines can be of great importance. One concept considered for ferrous-cased mines involves the use of two autonomous underwater vehicles (AUVs). The first AUV acts as a hunter vehicle which detects and classifies the mine using both sonar and magnetic sensors. The magnetic sensors determine the mine's position and both the magnitude and direction of the mine's magnetic moment. (The magnetic moment is a well known vector quantity which characterizes the magnetic source strength and the magnetic oreintation of a magnetized object.) Additionally, the hunter vehicle carries multiple second AUVs, or killer vehicles.

The killer vehicle functions like a mini-torpedo. After launch from the hunter vehicle, the killer vehicle anchors itself near the mine at a spot pre-determined by the hunter vehicle. After a delay that allows the hunter vehicle to leave the area, the killer vehicle moves towards the mine in order to destroy it.

One serious problem with this concept is providing the killer vehicle with accurate navigation information as it attempts to maneuver towards the mine and destroy it. The hunter vehicle has determined the mine's position within a certain error tolerance. Similarly, the killer vehicle has reached its intended anchor point within another error tolerance. If the killer vehicle uses the hunter vehicle's estimate of the mine's position and simple dead reckoning to navigate to the mine, these two sources of error (plus additional error sources such as the strength of unknown currents) may prevent the killer vehicle from passing close enough to the mine to destroy it. Moreover, since the killer vehicle is carried by the hunter vehicle, its warhead must be small and lightweight. Thus, an accurate placement of the killer vehicle's warhead near the casing of the mine may be required in order to ensure destruction. The more accurate the navigation system, the smaller the killer vehicle's warhead can be made thus saving weight. This, in turn, would either increase the endurance of the hunter vehicle or permit it to carry more payload including, possibly, more killer vehicles.

An active sonar could provide the necessary navigational information but would be more expensive and require more electrical power than the present invention.

SUMMARY OF THE INVENTION

The object of the invention is to accurately place the killer vehicle's warhead near the mine in order to ensure destruction by providing accurate navigation information to the killer vehicle.

Another object of the invention is to increase the endurance of the hunter vehicle by decreasing the weight of the warhead of the killer vehicle.

Another object of the invention is to reduce both the cost and the power needs of the killer vehicle by using passive measurements of the mine's magnetic field as navigation information for the killer vehicle compared to more expensive active sonar measurements.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a system for navigating underwater a killer vehicle towards a mine emitting a magnetic field, the system comprising two magnetic sensors, for measuring the magnetic field of the mine, fixedly joined to the killer vehicle at a predetermined distance apart along the fore-aft axis of the killer vehicle; a computer aboard the killer vehicle having a program for computing the relative position of the killer vehicle from the mine according to the measurement of the magnetic field of the mine by each magnetic sensor divided by the predetermined distance; and a guidance system aboard the killer vehicle for navigating the killer vehicle towards the mine according to the computed relative position.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 3 is a flow chart diagram of the method of navigating a killer vehicle near a mine.

PREFERRED EMBODIMENT OF THE INVENTION

Reference will now be made in detail to the present preferred embodiment of the invention, examples of which are illustrated in the accompanying drawings.

In accordance with the invention, the present invention includes a system for navigating underwater a killer vehicle towards a mine emitting a magnetic field, the system comprising two magnetic sensors, for measuring the magnetic field of the mine, fixedly joined to the killer vehicle at a predetermined distance apart along the fore-aft axis of the killer vehicle; a computer aboard the killer vehicle having a program for computing the relative position of the killer vehicle from the mine according to the measurement of the magnetic field of the mine by each magnetic sensor divided by the predetermined distance; and a guidance system aboard the killer vehicle for navigating the killer vehicle towards the mine according to the computed relative position.

Figure 2:
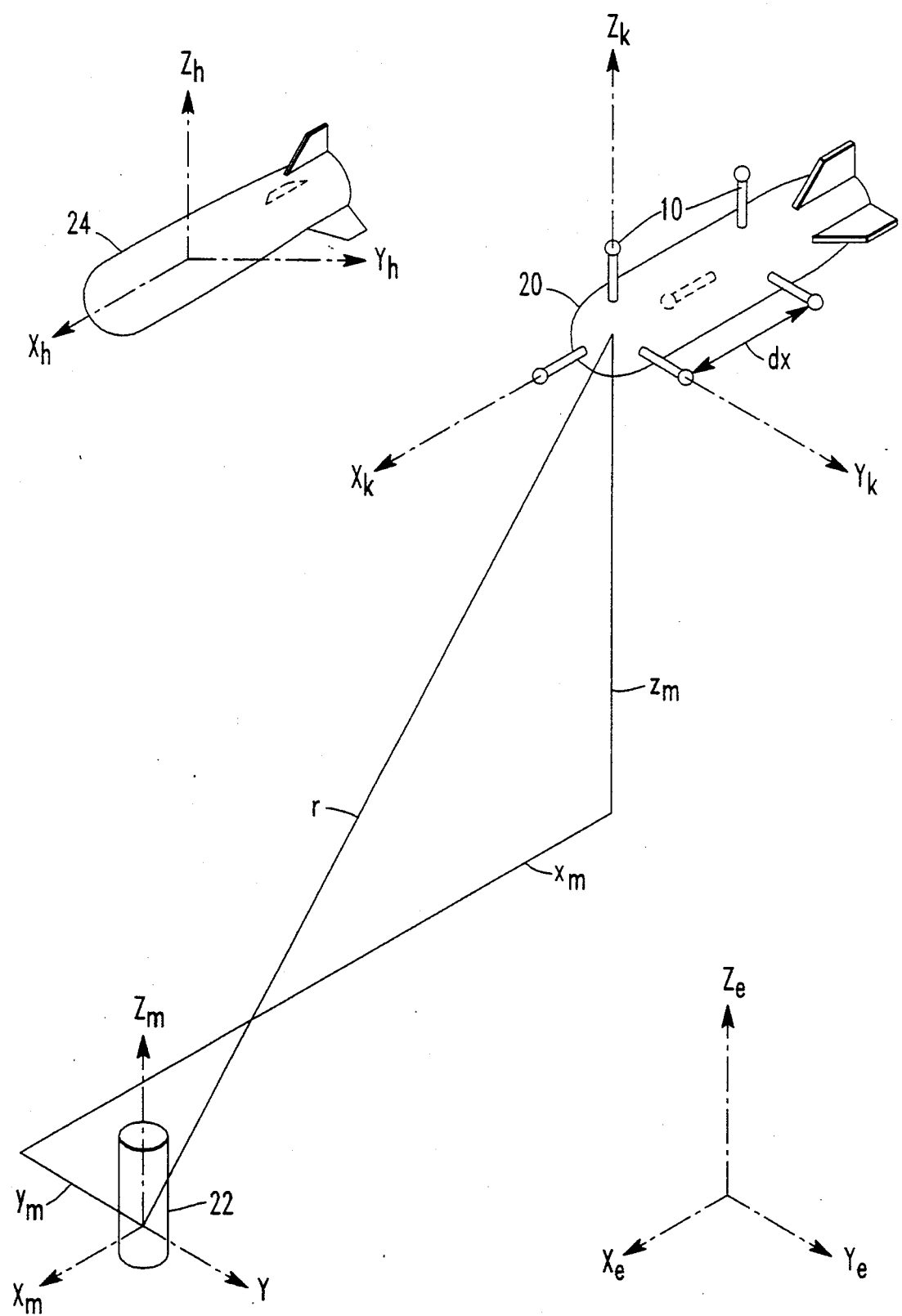
FIG. 2 shows a perspective of the area in which the system of navigating operates and the cartesian coordinate systems within that area.

FIG. 2 shows a perspective of the area in which the system of navigating operates and the relevant cartesian coordinate systems within that area. Using sonar and magnetic sensors, a hunter vehicle 24 locates a mine 22. The hunter vehicle 24 estimates the mine's relative position from a predetermined anchoring point near the mine 20 and the magnitude and orientation of the mine's magnetic moment. The hunter vehicle transmits these estimates to the onboard killer vehicle 20. Then the hunter vehicle 24 launches the killer vehicle 20 towards the anchor point.

In the preferred embodiment of this invention the killer vehicle 20 has an inertial navigation system (not shown) that measures the orientation of the killer vehicle 20 with respect to a set of axes fixed in the earth, $x_e$, $y_e$, $z_e$. One of the new concepts in tactical inertial navigation sensors could be employed as the inertial navigation system (see "New Inertial Sensor Uses Quartz Crystal Technology", Aviation Week and Space Technology, McGraw-Hill, Jun. 15, 1992, p. 101).

Furthermore, the killer vehicle 20 measures the mine's magnetic field. This could be done using just one tri-axial magnetometer 10 which measures the three orthogonal components of the mine's magnetic induction vector (B) as has been recently described in the literature (see D. G. Polvani, "A Magnetic System for AUV Position Resets" Undersea Defense Technology '92 Conference Proceedings, Jun. 30-Jul. 2, 1992, London, UK, pp. 369-374). The earth's large ambient magnetic field, however, may pose a dynamic range problem for a one magnetometer system. In addition, noise sources such as the magnetic noise arising from irregular motion of the tri-axial magnetometer in the earth's magnetic field (which gives rise to a time-varying magnetometer output) could create interference with the signal due to the mine 22.

The preferred solution makes use of two tri-axial magnetometers 10 separated by an amount dx along the fore-aft axis of the killer vehicle 20 to make two measurements of the mine's magnetic field. A subtraction of these two measurements removes the large steady component of the earth's field as well as other sources of noise common to the two magnetometers. For practical distances of operation, the magnetometers 10 should have a sensitivity equal to, or better than, 1 nanotesla. A sensitivity of 0.1 nanotesla is preferred as it allows longer initial distances between the mine 22 and the killer vehicle 20. Standard fluxgate tri-axial magnetometers have sensitivities in the range of 0.1 to 1 nanotesla.

Figure 1:
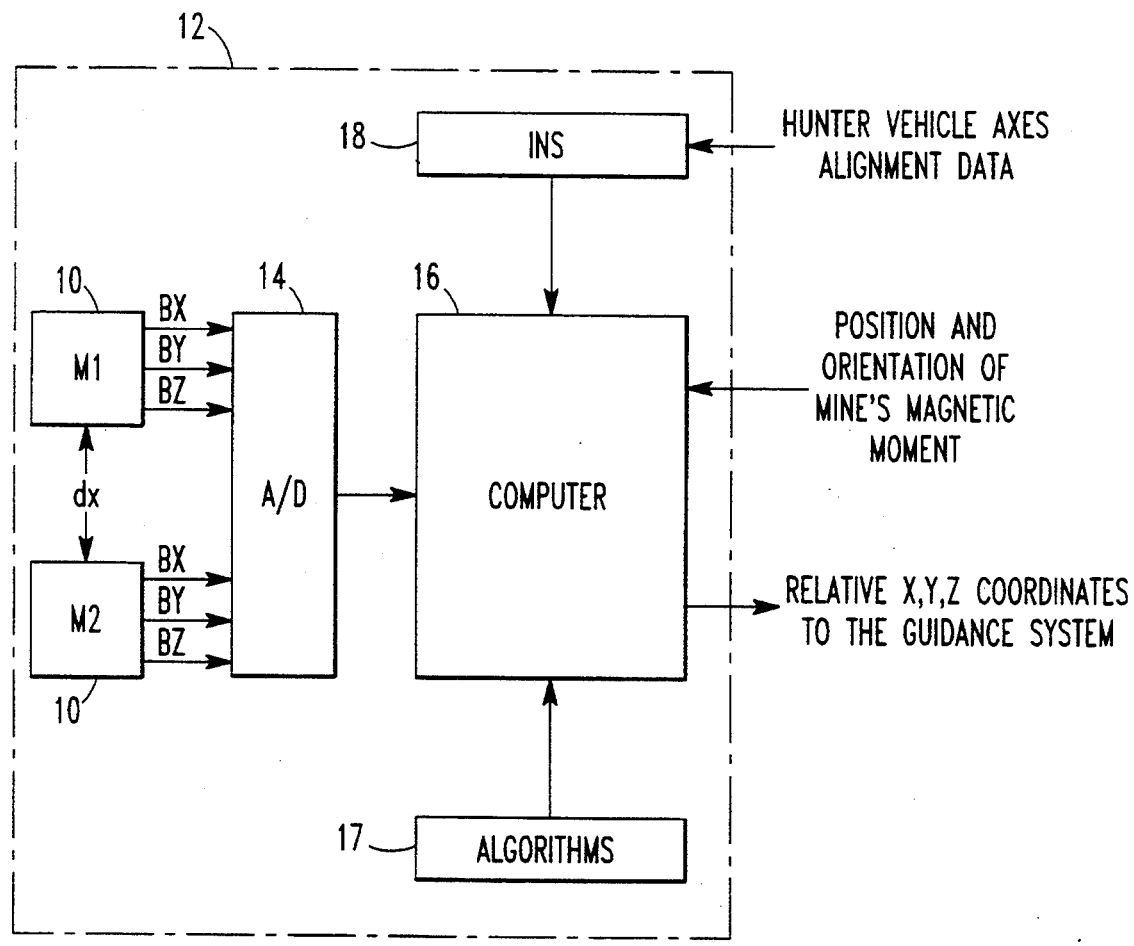
FIG. 1 is a functional block diagram of a preferred system for navigating a killer vehicle near a mine.

FIG. 1 is a functional block diagram of the system for navigating a killer vehicle 20 near a mine 22.

Before launching the killer vehicle 20, the onboard computer 16 receives the hunter vehicle's estimate of the relative position between the mine 22 and the predicted anchoring point of the killer vehicle 20 and the magnitude and direction of the mine's magnetic moment. The hunter vehicle 24 launches the killer vehicle 20 towards the anchor point. This could be accomplished by simply releasing the killer vehicle 20 with its anchor deployed when it is directly over the intended anchor point and choosing the buoyancy of the killer vehicle 20 so that it safely settles to the bottom and anchors itself. After a suitable time delay, which allows the hunter vehicle to leave the area, the killer vehicle 20 moves toward the mine 22. While doing so, the magnetometers 10 (M1 and M2) measure the mine's magnetic field and input their measurements through an analog-to-digital (A/D) converter 14 to the onboard computer 16.

In the preferred embodiment, the inertial navigation system (INS) 18 measures the killer vehicle's position and orientation with respect to coordinate axes fixed in the earth. These measurements are also provided to the computer 16. Moreover, algorithms 17 containing instructions for performing the method of navigating a killer vehicle 20 near a mine 22 is inputted to the computer 16.

Using the method described herein, sufficient information to numerically compute the relative position between the killer vehicle 20 and the mine 22 is contained in the magnitude and orientation of the mine's magnetic moment and the orientation attitude of the killer vehicle 20. A guidance system (not shown) in the killer vehicle 20 receives the resultant computed relative position and guides the killer vehicle 20 to the anchor point accordingly.

As shown in FIG. 2, four coordinate systems are used in the computation of the relative position. An understanding of these coordinate systems is necessary before discussing the details of the method of navigating a killer vehicle near a mine.

The first coordinate system is fixed in the earth with axes, $x_e$, $y_e$, $z_e$. An inertial navigation system in the hunter vehicle 24 and an inertial navigation system in the killer vehicle 20 are aligned along these axes.

The second coordinate system is fixed in the hunter vehicle 24 with axes $x_h$, $y_h$, $z_h$. The inertial navigation system in the hunter vehicle determines the position and orientation of these axes with respect to the earth fixed axes.

The third coordinate system is fixed in the killer vehicle 20 with axes $x_k$, $y_k$, $z_k$. The $x_k$ axis direction is taken along the vehicle's fore-aft axis. The inertial navigation system in the killer vehicle 20 determines the position and orientation of these axes with respect to the earth fixed axes.

The fourth coordinate system is fixed in the mine 22 with axes $x_m$, $y_m$, $z_m$. The $z_m$ axis is taken along the magnetic moment of the mine 22. These coordinates give directly the position of the killer vehicle 20 relative to the mine 22. Also, these coordinates are used for mathematical convenience in expressing the components of the mine's magnetic field. Hereafter, these coordinates are referred to as the relative coordinates.

Using known methods (for example, W. Wynn et al., "Advanced Superconducting Gradiometer/Magnetometer Arrays and a Novel Signal Processing Technique," IEEE Trans. Mag., vol. MAG-II, pp. 701-707, Mar. 1975) a magnetic gradiometer and the inertial navigation system in the hunter vehicle 24 are used to determine the position and orientation of the magnetic moment of the mine 22 in the earth fixed coordinates. The hunter vehicle 24 also determines the anchor point of the killer vehicle 20. The anchor point is located a predetermined distance and direction away from the position of the magnetic moment of the mine 22.

FIG. 3 is a flow chart diagram of the method of navigating a killer vehicle near a mine using algorithms 17.

The killer vehicle's computer 16 generates the mine coordinates from the hunter vehicle's measurement of the position and orientation of the mine's magnetic moment with respect to the earth fixed coordinate axes. To accomplish this the computer 16 first translates a set of coordinate axes, which are parallel to the earth fixed coordinates, to the position of the mine 22 and then rotates these axes so that their new z axis ($z_m$) is parallel to the mine's magnetic moment. The orientation of the $x_m$, $y_m$ axes in a plane perpendicular to the $z_m$ axis is arbitrary.

Using the killer vehicle's orientation as measured by its inertial navigation system, the computer 16 can compute the angular orientation between the killer vehicle and mine coordinate axes and, thus, can compute coordinate transformations between these two systems.

The computer 16 next executes the following sequential steps in order to compute the relative coordinates between the killer vehicle 20 and the mine 22:

1. Using the orientation of the killer vehicle 20, transform the three orthogonal components of the mine's magnetic induction measured from each magnetometer 10 along the killer vehicle's axes ($Bx_k$, $By_k$, $Bz_k$), to the equivalent three components along the mine's axes ($Bx_m$, $By_m$, $Bz_m$). This can be achieved by using standard coordinate transformation techniques (see, for example, H. Goldstein, "Classical Mechanics," Addison-Wesley, Reading, Mass., 1959);

2. Forming the three directional derivatives along the x axis of the killer vehicle 20 of the transformed magnetic induction components as, $$\frac{\partial Bx_m}{\partial x} = \frac{Bx_m(1) - Bx_m(2)}{dx} \quad (1)$$

$$\frac{\partial By_m}{\partial x} = \frac{By_m(1) - By_m(2)}{dx} \quad (2)$$

$$\frac{\partial Bz_m}{\partial x} = \frac{Bz_m(1) - Bz_m(2)}{dx} \quad (3)$$

where dx is the separation of the two magnetometers 10 along the killer vehicle's fore-aft axis, (1) refers to the first magnetometer 10 (M1), and (2) refers to the second magnetometer 10 (M2);

3. Setting each directional derivative equal to a non-linear function (described later) of the relative coordinates between the killer vehicle 20 and the mine 22 along the mine's axes and solving for the relative coordinates.

4. Providing the calculated relative coordinates to the killer vehicle's guidance system and steering the killer vehicle 20 to the anchor point.

The computer 16 cycles through steps 1–4 each time a new set of magnetometer outputs is sampled. The required sampling rate depends on the required hit accuracy and the requirements of the killer vehicle's guidance system. Since the mine's magnetic field falls off inversely with the cube of range (and the directional derivatives of the magnetic induction fall off as the fourth power of range), the maximum sampling rate required occurs at near ranges where the magnetic field is rapidly varying. An order of magnitude analysis using standard analytical techniques indicates that to achieve a required hit accuracy the sampling rate (N) is given by the following equation:

$$N = 400 \frac{V}{Rp} \quad (7)$$

where V is the killer vehicle's speed, R is range to the mine 22, and p is the maximum permissible change (in percent) from sample to sample in the measured directional derivatives to achieve the required hit accuracy. The sampling rate is directly proportional to the killer vehicle's speed and inversely proportional to range and the allowable percent change in the measured directional derivatives of the magnetic field. For a 10 kt speed (5 m/s) 5 m from the mine, with p equal to 10%, the required sampling rate is about 40 samples per second which is easily achieved with standard practice.

In step 3 above, the non-linear functions are derived from standard magnetic dipole equations and the known angular relationship between the killer vehicle's axes and the mine's axes. This yields, $$\frac{\partial Bx_m}{\partial x_k} = \alpha \frac{\partial Bx_m}{\partial x_m} + \beta \frac{\partial Bx_m}{\partial y_m} + \gamma \frac{\partial Bx_m}{\partial z_m} \quad (4)$$

$$\frac{\partial By_m}{\partial x_k} = \alpha \frac{\partial By_m}{\partial x_m} + \beta \frac{\partial By_m}{\partial y_m} + \gamma \frac{\partial By_m}{\partial z_m} \quad (5)$$

$$\frac{\partial Bz_m}{\partial x_k} = \alpha \frac{\partial Bz_m}{\partial x_m} + \beta \frac{\partial Bz_m}{\partial y_m} + \gamma \frac{\partial Bz_m}{\partial z_m} \quad (6)$$

where $\alpha$, $\beta$, $\gamma$ are the direction cosines of the line dx with respect to the relative coordinates $x_m$, $y_m$, $z_m$. They are calculated by standard techniques (see, for example, H. Goldstein, op. cit.) using the known orientation of the killer vehicle axes ($x_k$, $y_k$, $z_k$) and the relative coordinate axes ($x_m$, $y_m$, $z_m$).

The partial derivatives on the right hand side of Equations (4)–(6) are computed as follows. The well known expression for the magnetic induction of a magnetic dipole is given by (see, for example, J. E. Mcfee and Y. Das, "Fast Recursive Method for Estimating Location and Dipole Moment Components of a Static Magnetic Dipole," IEEE Trans. on Geoscience and Remote Sensing, Vol. GE-24, Sept. 1986, pp. 663–673):

$$\overline{B} = \frac{\mu_o}{4\pi r_m^3} \left[ \frac{3(\overline{M} \cdot \overline{r}_m)r}{r^2} - \overline{M} \right] \quad (7)$$

where: $\mu_o$ = permeability of free space ($4\pi \times 10^{-7}$ weber/meter-ampere), $\overline{M}$ = magnetic moment of the mine, and $r_m = (x_m^2 + y_m^2 + z_m^2)^{\frac{1}{2}}$ Taking $\overline{M}$ along the $z_m$ axis using standard techniques:

$$Bx_m = \frac{3\mu_o M}{4\pi} \frac{x_m z_m}{r_m^5}, \quad (8)$$

$$By_m = \frac{3\mu_o M}{4\pi} \frac{y_m z_m}{r_m^5}, \quad (9)$$

$$Bz_m = \frac{\mu_o M}{4\pi} \left[ \frac{2z_m^2 - x_m^2 - y_m^2}{r_m^5} \right], \quad (10)$$

The partial derivatives of $Bx_m$, $By_m$, $Bz_m$ are then obtained by standard calculus differentiation of the right hand sides of Equations (8)–(10).

Equations 4–6 determine the desired relative coordinates $x_m$, $y_m$, $z_m$ between the mine 22 and the killer vehicle 20. The left hand side of each equation is determined by the magnetometer measurements, as in Equations 1–3. Since the right hand sides are non-linear, a numerical solution procedure is necessary. Standard solution methods are available (see W. M. Press et al., , "Numerical Recipes" Cambridge University Press, Cambridge, 1989, Chapter 9).

To start the numerical solution method, an initial trial solution is necessary. This initial trial relative position solution is provided by substracting the hunter vehicle's estimate of the position of anchoring point of the killer vehicle 20 from its estimate of the position of the mine 22. As the killer vehicle 20 is guided to the mine 22, new relative positions are determined and at a rate determined by the requirements for final hit accuracy and the needs of the guidance system. The initial trial solution for each new position determination is provided by the results of the previous calculation of the relative position. Because these trial solutions are relatively close to the true solution, convergence of the numerical method is rapid and multiple solutions are avoided. Computer simulations to date have verified these desirable properties.

It will be apparent to those skilled in the art that various modifications and variations can be made in the magnetic navigation system of the present invention and in construction of this magnetic navigation system without departing from the scope and spirit of the invention being indicated by the following claims. Other embodiments of the invention will be apparent to those skilled in the art from consideration of the specification and practice of the invention disclosed herein.

We claim:

1. A method of navigating underwater a killer vehicle to a mine emitting a magnetic field, the vehicle having two magnetic sensors at a predetermined distance apart along its fore-aft axis and a computer, the method comprising the steps of:

measuring at each sensor the magnetic field of the mine;

computing the relative position of the killer vehicle from the mine according to the difference of the measurement of the magnetic field made by each magnetic sensor divided by the predetermined distance;

navigating the killer vehicle towards the mine according to the computed relative position.

2. A method of navigating an underwater killer vehicle according to claim 1, the step of computing the relative position of the killer vehicle from the mine being performed each time the step of measuring is performed.

3. A system for navigating underwater a killer vehicle towards a mine emitting a magnetic field, the system comprising:

two magnetic sensors, for measuring the magnetic field of the mine, fixedly joined to the killer vehicle at a predetermined distance apart along the fore-aft axis of the killer vehicle;

a computer aboard the killer vehicle having a program for computing the relative position of the killer vehicle from the mine according to the measurement of the magnetic field of the mine by each magnetic sensor divided by the predetermined distance; and a guidance system aboard the killer vehicle for navigating the killer vehicle towards the mine according to the computed relative position.

4. A system for navigating a killer vehicle according to claim 3, wherein the magnetic sensors are tri-axial fluxgate magnetometers for measuring the magnetic field of the mine in three orthogonal directions.

5. A system for navigating a killer vehicle according to claim 3, wherein the navigation system is an inertial navigation system.

* * * * *